(12) United States Patent
Marchesan

(10) Patent No.: US 7,021,394 B2
(45) Date of Patent: Apr. 4, 2006

(54) ARTICULATING AND LOCKING MECHANISM FOR FARM IMPLEMENT CHASSIS

(75) Inventor: Joâo Carlos Marchesan, Matão (BR)

(73) Assignee: Marchesan Implementos E Máquinas Agrícolas Tatú S/A, São Paulo (BR)

( * ) Notice: Subject to any disclaimer, the term of this patent is extended or adjusted under 35 U.S.C. 154(b) by 0 days.

(21) Appl. No.: 10/833,934

(22) Filed: Apr. 28, 2004

(65) Prior Publication Data

US 2005/0039932 A1     Feb. 24, 2005

(30) Foreign Application Priority Data

Apr. 28, 2003   (BR) .................................. 0301344

(51) Int. Cl.
*A01B 49/00* (2006.01)
(52) U.S. Cl. .................... 172/311; 172/293; 172/452
(58) Field of Classification Search ............... 172/293, 172/294, 310, 311, 315–317, 324, 452, 456, 172/457, 458, 470
See application file for complete search history.

(56) References Cited

U.S. PATENT DOCUMENTS

| | | | |
|---|---|---|---|
| 2,972,385 A | 2/1961 | Walberg | |
| 3,511,319 A | 5/1970 | Hansen et al. | |
| 3,614,134 A * | 10/1971 | Moriceau et al. | 37/466 |
| 3,650,333 A | 3/1972 | Fueslein | |
| 3,692,121 A | 9/1972 | Kenney | |
| 3,713,485 A | 1/1973 | Redford | |
| 3,811,516 A | 5/1974 | Thompson et al. | |
| 3,814,191 A | 6/1974 | Tilbury | |
| 3,874,459 A * | 4/1975 | Herberholz | 172/311 |
| 3,944,001 A | 3/1976 | Warner et al. | |
| 4,061,195 A | 12/1977 | Pryor | |
| 4,074,766 A * | 2/1978 | Orthman | 172/311 |
| 4,159,038 A | 6/1979 | Eichenberger | |
| 4,316,511 A | 2/1982 | Andersen | |
| 4,399,875 A | 8/1983 | Schaaf et al. | |
| 4,512,416 A | 4/1985 | Smith | |
| 4,529,043 A * | 7/1985 | Jensen et al. | 172/776 |
| 4,561,505 A | 12/1985 | Williamson | |
| 4,576,238 A * | 3/1986 | Spencer | 172/311 |
| 4,825,958 A * | 5/1989 | Kelderman | 172/413 |
| 4,862,758 A | 9/1989 | Magee | |
| 4,923,017 A * | 5/1990 | Meek et al. | 172/776 |
| 6,761,228 B1 * | 7/2004 | Dobson et al. | 172/311 |

* cited by examiner

*Primary Examiner*—Thomas B. Will
*Assistant Examiner*—Alexandra Pechhold
(74) *Attorney, Agent, or Firm*—Wong, Cabello, Lutsch, Rutherford & Brucculeri, LLP

(57) ABSTRACT

An articulating and locking mechanism of agricultural implement chassis is disclosed, intended for disc harrows and other implements with great working width, which are characterized by articulation to reduce the total width so as to facilitate transportation and storage, constituted of a main structure or chassis (1), central disc gang chassis (2), lateral and articulating disc gang chassis (3), with arrangements of vertical plates or extensions (4 and 5) welded and joined by shafts (6) for articulation by means of hydraulic cylinders (7), equipped with locking mechanism made up of hydraulic cylinders (8), locking and unlocking actuators (9, 9A), locks (12, 12A), coupling shafts (13, 13A) inserted in sleeves (14, 14A) and joined to the vertical closure plates (15) of the inner ends of the articulating chassis (3). Locking flanges (17) welded to the central chassis (2) form a quick closing action with the locks (12, 12A) providing rigidity in the locking between said rigid and articulating chassis during the implement's field operation.

5 Claims, 6 Drawing Sheets

ARTICULATING AND LOCKING MECHANISM FOR FARM IMPLEMENT CHASSIS

RELATED APPLICATIONS

This application claims priority on Brazil Application No. PI 0301344-8 entitled "ARTICULATING AND LOCKING MECHANISM FOR FARM IMPLEMENT CHASSIS" filed on Apr. 28, 2003, which is hereby incorporated herein by reference. The benefit of 35 U.S.C. § 119 is claimed for the above referenced application.

BACKGROUND OF THE INVENTION

1. Field of the Invention

This invention refers to the articulating and locking mechanism of farm implements, such as disc harrows and others of great working width, needing reduction of the total width so as to enable transport on roads and farm paths and to also facilitate its storage during intercrop periods, when it must occupy a reduced area in the machine sheds or yards.

2. Related Art

There are several mechanisms to raise and lower the mobile parts or chassis extensions of agricultural equipment, ranging from those manually operated, with the aid of draw springs, to the latest, operated with auxiliary power from hydraulic actuators activated by the tractor source itself.

The known solutions for articulation of farm implement chassis, and which make up the prior art, can be found in U.S. Pat. Nos. 2,972,385; 3,511,319; 3,650,333; 3,692,121; 3,713,495; 3,811,516; 3,814,191; 3,944,001; 4,061,195; 4,159,038; 4,316,511; 4,399,875; 4,512,416; 4,561,505 and 4,862,758.

SUMMARY OF THE INVENTION

In these known implements from prior art, especially those described in more recent patent applications, a difficult construction with high operating cost is believed to be the major inconvenience, with excess components assembled under minimum tolerance margins, with many points of articulation, and therefore subject to wear and early functional problems in relation to the equipment's useful life, especially under the arduous field working conditions, such as those faced by disc harrows in primary soil preparation.

In order to obtain full locking of these chassis for the efficient operation of the equipment in the field, at least two bolts have been used at each articulating end, which solves the problem of locking. However, on the other hand, this causes great inconvenience to the operator when unlocking said implement chassis so as to change it from the normal working position to the transport position and, after unlocking, locking them again in the working position.

The known devices cited demand time and work from the operator, and there is the inconvenience of having to use several components to lock the chassis in the working position, which consequently renders the equipment's structure fragile, especially in disc harrows used in preparing primary soil.

The greatest inconvenience of products belonging to prior art is in the very low efficiency of these mechanisms for the proper locking of the implement's chassis when in the normal working position, where they are subjected to high loads (even torsion force of the chassis can be found in the field), according to variations in soil consistency, surface irregularities or even obstacles below the surface. Existing structures, such as in U.S. Pat. Nos. 3,692,121 and 4,061,195, are believed to be fragile and have excess mobile components, with many points of articulation and, as a result, friction and early wear between said parts, in addition to their not forming a sufficiently strong supporting base for rigid locking of the chassis during the equipment's field operating position, when there is great reaction from the soil on raising said articulating ends. Although there is no need for manual interference from the operator, as described in the above patent, to raise, lower and lock said chassis, those constructive conceptions are believed to present the inconveniences mentioned above.

A need has therefore arisen for an articulating and locking mechanism that overcomes the limitations in the prior art. The present invention provides an articulating mechanism to raise and lower the chassis of farm implements in a fast, simple and safe manner so that the operator can alternate the equipment between the operation—transportation—operation positions. Furthermore, the present invention provide an efficient locking mechanism between the articulating chassis during field operation, in a way that all the load borne during the work is absorbed by the points of articulation specially developed in the mentioned chassis, which are provided with vertical support by means of strategically defined joints for the absorption and dissipation of said loads found during the equipment's operation.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF THE INVENTION

Figure 1:
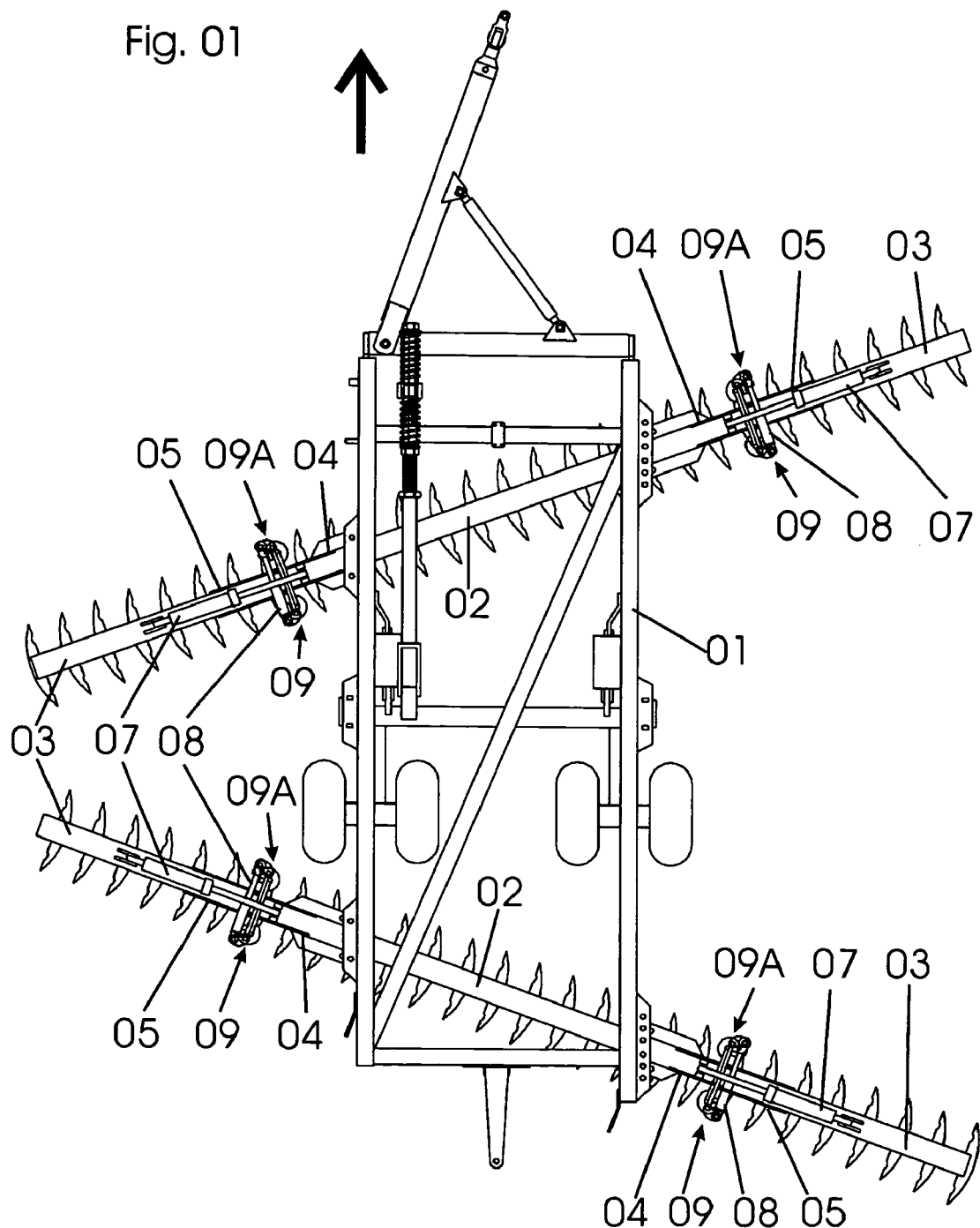
FIG. 1 is a plan view of a harrow equipped with articulating and locking mechanism of its disc gang chassis.
Figure 2:
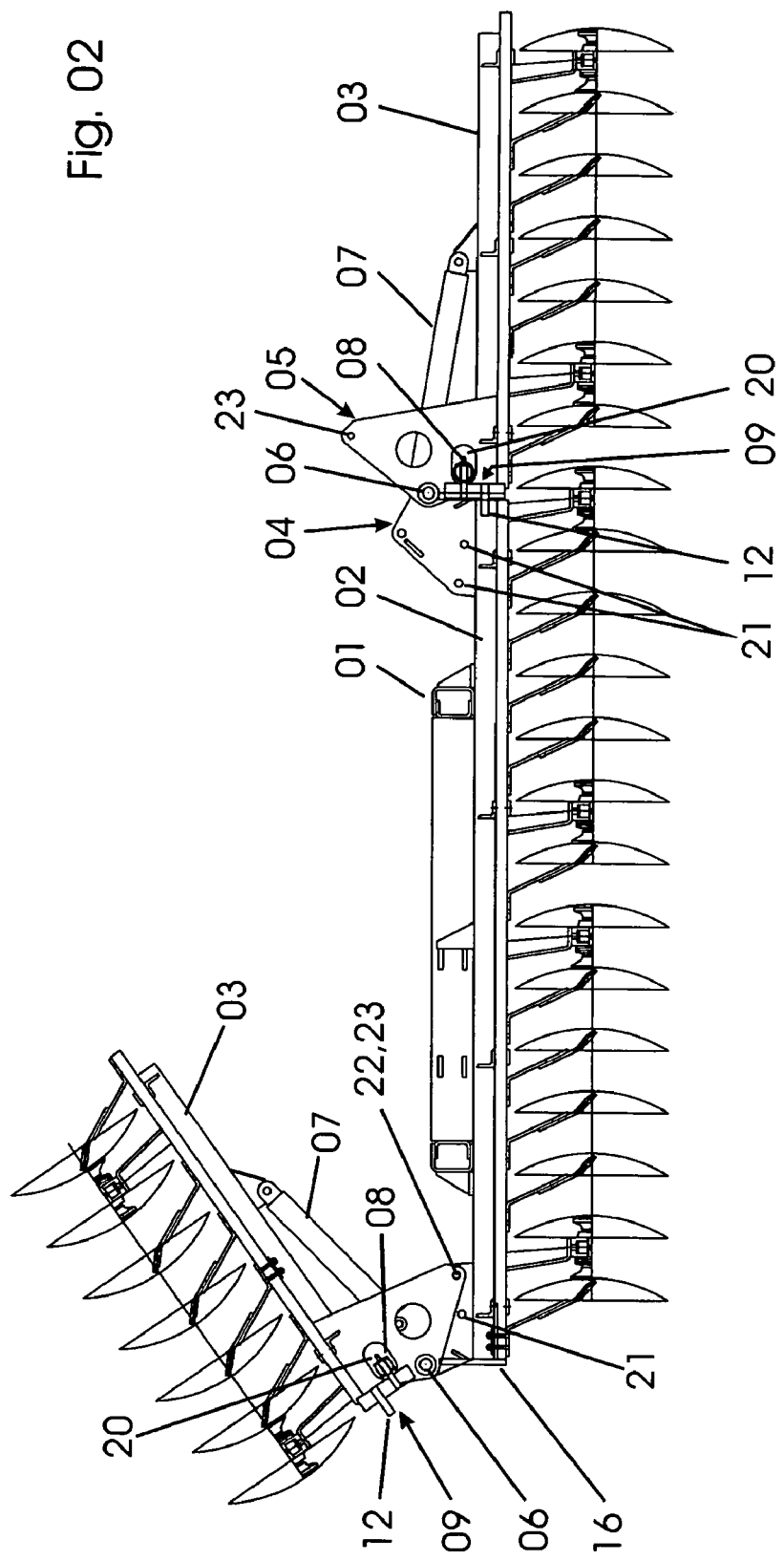
FIG. 2 is a partial back view showing the articulating and locking mechanism of a section of the disc gang chassis. One end of the chassis is in the normal working position of the soil and the other end is articulated to the transport position.
Figure 3:
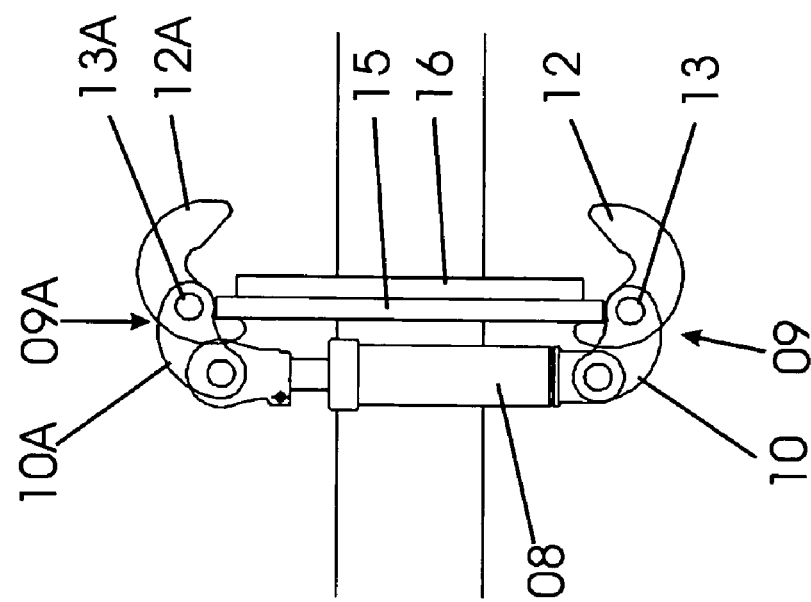
FIG. 3 is a detailed plan view of the locking mechanism of the disc gang chassis, wherein the implement is in the normal working position of the soil.
Figure 4:
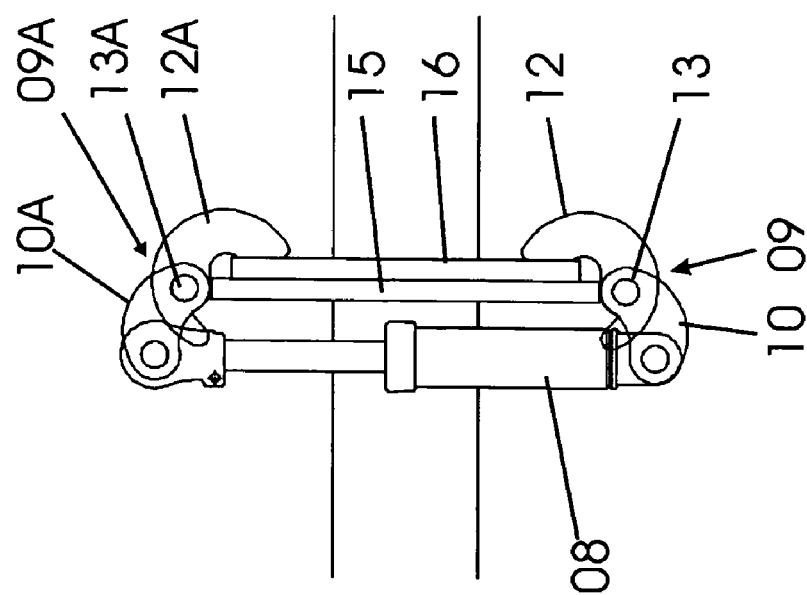
FIG. 4 is a detailed plan view of the locking mechanism of the disc gang chassis, wherein the implement is in the transport position.
Figure 5:
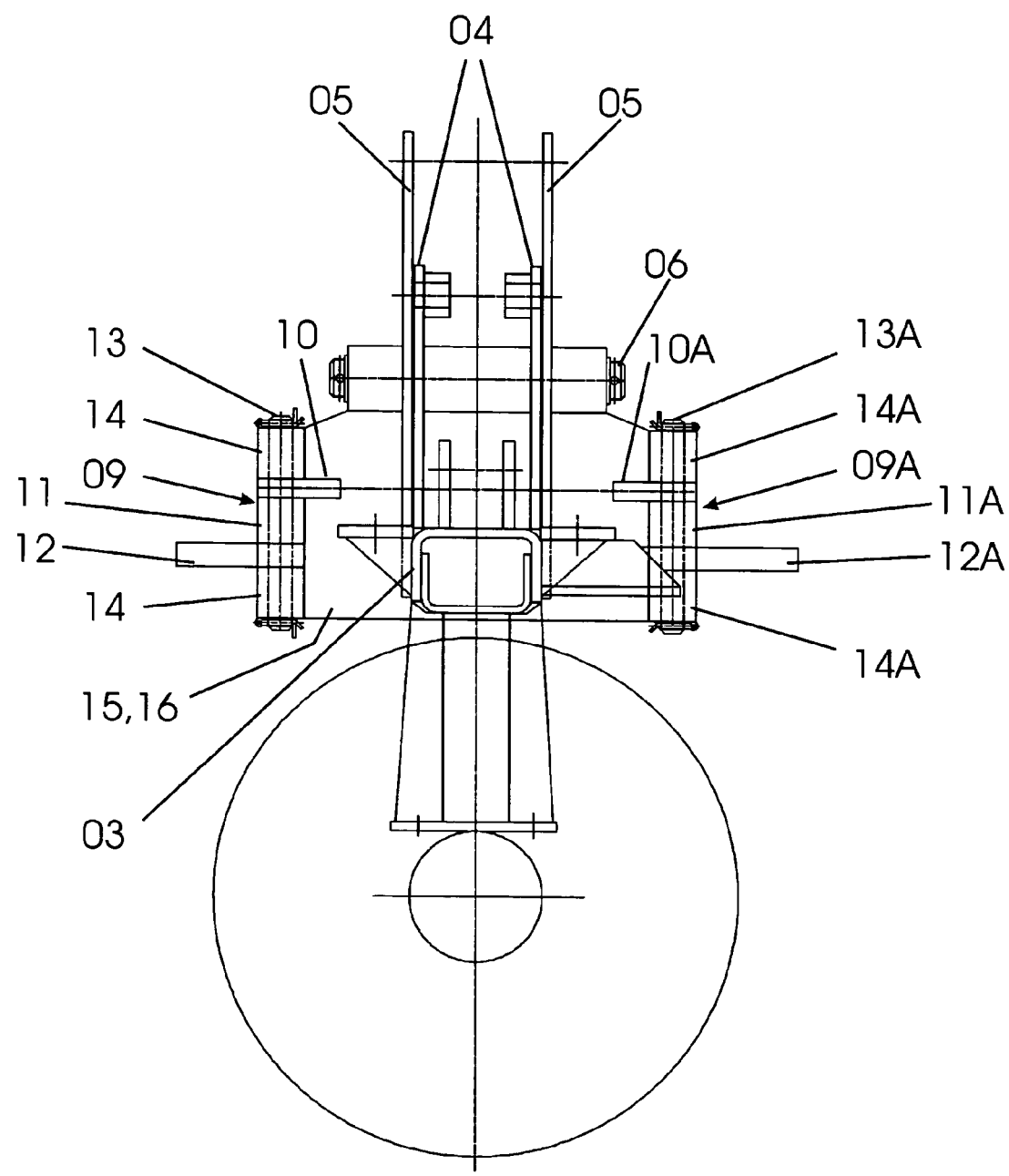
FIG. 5 is a vertical section of the disc gang chassis, highlighting the locking components of the chassis.
Figure 6:
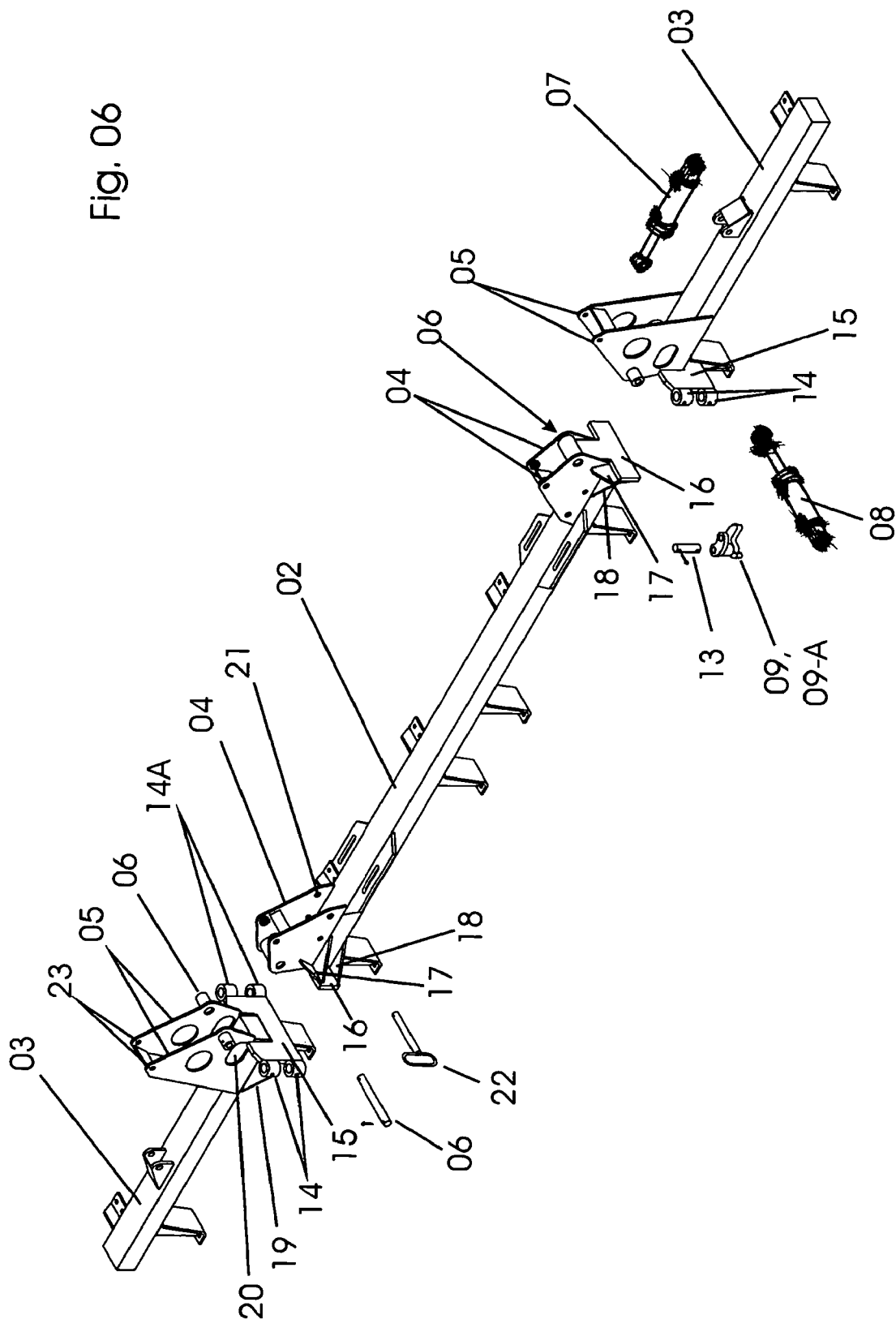
FIG. 6 is an exploded view of the chassis articulating and locking mechanism.

An agricultural implement with articulating chassis is generally comprised of a main structure or chassis (1) equipped with means of coupling to a tractor and tires for quick transportation on the field or rural roads.

The central disc gangs (2) are rigidly aggregated to the main structure (1). Articulated to the ends of the central disc gangs are lateral disc gang chassis (3) by means of pairs of plates or extensions (4 and 5) welded to said chassis and joined respectively by axles (6), and whose articulating motions are obtained normally by hydraulic cylinders (7) placed between said central and lateral chassis (2 and 3).

The mechanism developed for the quick and effective locking of said chassis during field operation is made up of a transversal arrangement of hydraulic cylinders (8) coupled to locking and unlocking actuators (9, 9A) made up of articulators (10, 10A) joined by welding to the central sleeves (11, 11A) and to the locks (12, 12A) themselves. The locking and unlocking actuators (9, 9A) are fitted by coupling shafts (13 and 13A) inserted respectively in sleeves (14, 14A) built in the vertical closure plates (15) and rigidly arranged at the internal ends of the articulating disc gang chassis (3). Other closure plates (16) are also normally arranged at the ends of the central disc gang chassis (2) and form the supporting base.

Welded plate flanges (17) positioned slightly inwards in relation to the vertical plane and with the ends of the central disc gang chassis (2) constitute a quick closing operation with the resultant action of the cylinders (8) on the locking and unlocking actuators (9, 9A) and respective locks (12, 12A), providing rigidity between said central disc gang chassis (2) and articulating chassis (3) when in horizontal alignment position, that is, for execution of the field work.

Complementary reinforcing flanges (18 and 19) provide a solid support to keep the set firmly locked during field operation.

Openings (20) are made on the surfaces of the vertical extensions (5) of the articulating chassis (3), and enable the transversal seating and free operation of the locking cylinders (8). Orifices (21) made in the extensions (4) receive the locking pins (22) (being that one orifice is intended for the idle position of the locking pin (22)) and the other pin is to be fixed to the orifices (23) during articulation of the lateral chassis (3) and constitutes an additional locking normally used for the safe transportation of the equipment over long distance and for storage.

Figures 7, 7A:
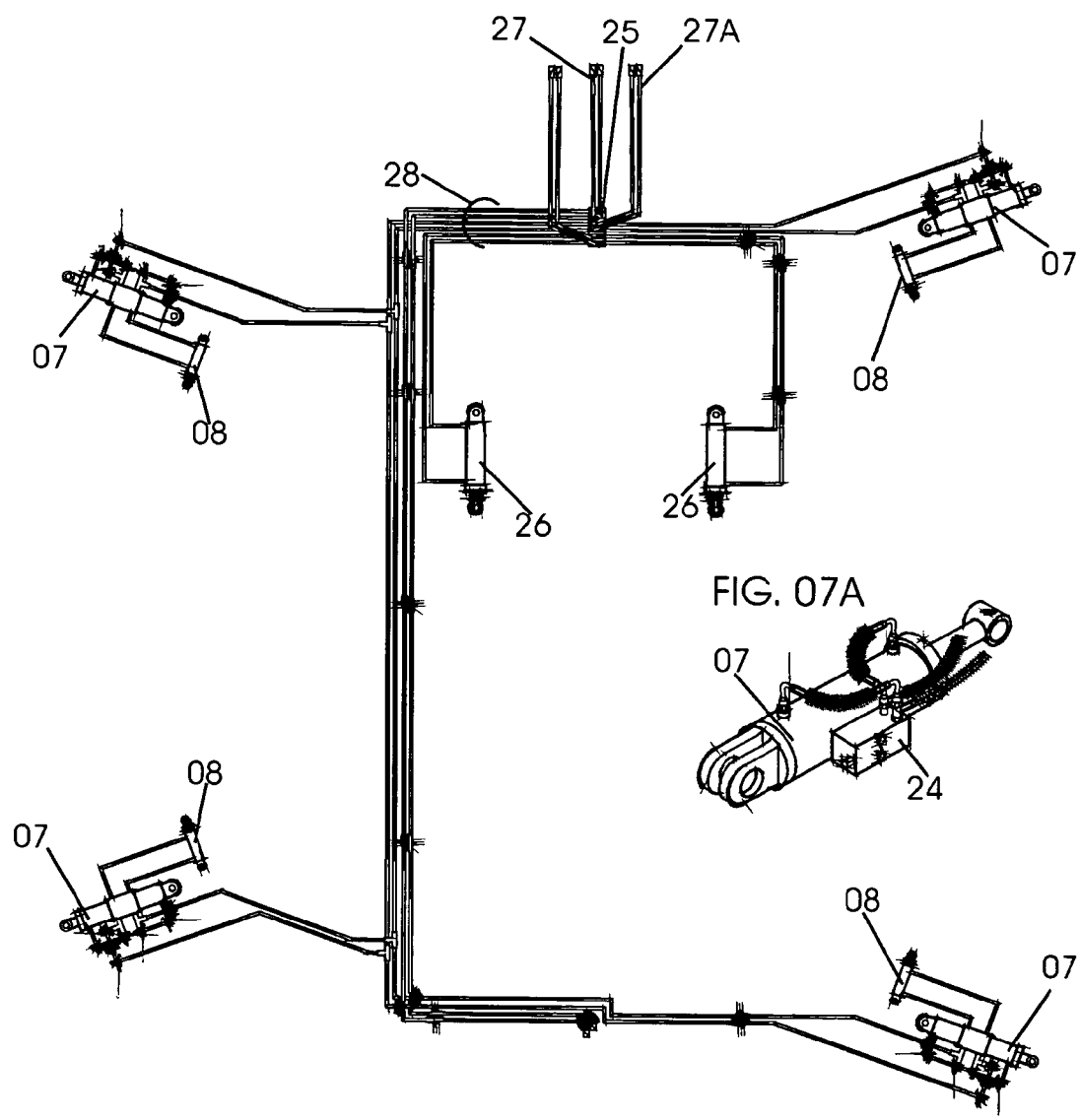
FIG. 7 is a schematic diagram of a hydraulic circuit for actuating the chassis articulating and locking mechanism, including the normal transporting wheel assembly of the implement.
FIG. 7A is a detailed perspective view of one of the articulating cylinders and sequential valve.

As shown schematically in FIG. 7 and the detail in FIG. 7A, a hydraulic circuit developed to activate the normal components of an agricultural equipment and now added by hydraulic locking cylinders (8) makes use of sequential valves (24) for the correct alternate and automatic operation between the different cylinders in such a way as to execute a convenient operating sequence as exemplified below.

To change the implement from a working position to a transport position, first the articulating chassis (3) and rigid chassis (2) are unlocked by the action of the hydraulic cylinders (8) on the locking and unlocking actuators (9, 9A). This action consequently raises the lateral disc gang chassis (3) by the action of the hydraulic cylinders (7).

To change the implement from a transport position to a working position, first the disc gang chassis (3) is disarticulated by the action of the cylinders (7). This action consequently locks the articulating chassis (3) and rigid chassis (2) by the action of the cylinders (8) on the locking and unlocking actuators (9, 9A).

An oil flow manifold valve (25) supplies the cylinders in each articulating end of the disc gang chassis (3).

The hydraulic cylinders (26) are components of the wheel system with tires for the normal transportation of the equipment. Lines for supply of hydraulic fluid (27, 27A) come from the tractor source and supply the different oil tubes (28) of the equipment Further modifications and alternative embodiments of this invention may be made without departing from the spirit and scope of the invention. Accordingly, this description is to be construed as illustrative only and is for the purpose of teaching those skilled in the art the manner of carrying out the invention. It should be understood that the invention is not intended to be limited to the particular forms disclosed. Rather, the invention covers all modifications, equivalents and alternatives falling within the spirit and scope of the invention as defined by the appended claims. Various changes may be made in the shape, size, and arrangement of parts without departing from the spirit and scope of the invention. In addition, the terms "a" and "an" are generally used herein to mean one or more.

What is claimed is:

1. An articulating and locking mechanism of an agricultural implement chassis, the mechanism comprising:
    a rigid disc gang chassis (2), at the ends of which are lateral disc gang chassis (3) with vertical plates (4 and 5) arranged in parallel and that can be articulated by means of a pivot shaft (6) and by the action of a hydraulic cylinder (7), characterkrized as the joint between the rigid chassis (2) and the articulating chassis (3) defined by locking means between said chassis when in the operating position, obtained through the hydraulic cylinders (8) arranged transversally in relation to the disc gang chassis and connected to actuators (9, 9A) for locking motion and chassis release according to the implement's operating cycle;
    wherein the actuators (9, 9A) comprise articulators (10, 10A) joined by a weld to central sleeves (11, 11A) and to locks (12, 12A), fitted by means of coupling shafts (13, 13A) inserted respectively in sleeves (14, 14A) vertically built in the front closure plates (15) of the articulating disc gang (3).

2. The articulating and locking mechanism as claimed in claim 1, further comprising a hydraulic circuit for sequential actuation between the hydraulic articulating cylinder (7) and locking cylinder (8) provided by a sequential valve (24).

3. The articulating and locking mechanism as claimed in claim 1, further comprising one or more flanges coupled to said central disc gang chassis.

4. The articulating and locking mechanism as claimed in claim 3, further comprising a hydraulic circuit for sequential actuation between the hydraulic articulating cylinder (7) and locking cylinder (8) provided by a sequential valve (24).

5. An articulating and locking mechanism of an agricultural implement chassis, the mechanism comprising:
    a rigid disc gang chassis (2), at the ends of which are lateral disc gang chassis (3) with vertical plates (4 and 5) arranged in parallel and that can be articulated by means of a pivot shaft (6) and by the action of a hydraulic cylinder (7), characterized as the joint between the rigid chassis (2) and the articulating chassis (3) defined by locking means between said chassis when in the operating position, obtained through the hydraulic cylinders (8) arranged transversally in relation to the disc gang chassis and connected to actuators (9, 9A) for locking motion and chassis release according to the implement's operating cycle; and
    a hydraulic circuit for sequential actuation between the hydraulic articulating cylinders (7) and locking cylinders (8) provided by sequential valves (24).

* * * * *